W. H. BAUERT.
SIGNAL MEANS FOR AUTOMOBILES FOR INDICATING THEIR DIRECTION OF ROUTE OR STOPPAGE.
APPLICATION FILED OCT. 25, 1920.
1,408,335.
Patented Feb. 28, 1922.
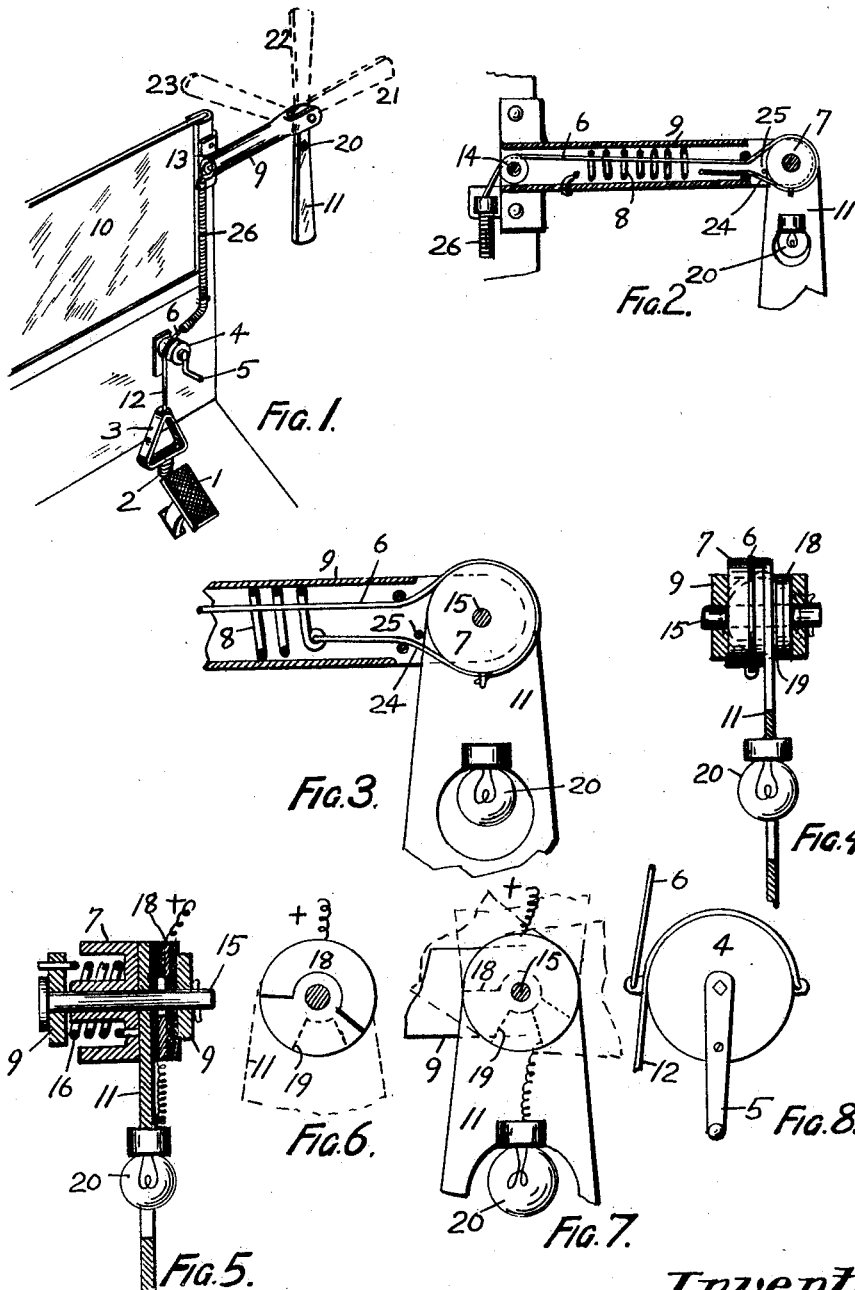

UNITED STATES PATENT OFFICE.

WILLIAM HENRY BAUERT, OF ROSEVILLE, NEAR SYDNEY, NEW SOUTH WALES, AUSTRALIA.

SIGNAL MEANS FOR AUTOMOBILES FOR INDICATING THEIR DIRECTION OF ROUTE OR STOPPAGE.

1,408,335. Specification of Letters Patent. Patented Feb. 28, 1922.

Application filed October 25, 1920. Serial No. 419,479.

*To all whom it may concern:*

Be it known that WILLIAM HENRY BAUERT, a subject of the King of Great Britain and Ireland, and residing at Shirley Road, Roseville, near Sydney, New South Wales, Australia, has invented certain new and useful Signals Means for Automobiles for Indicating Their Direction of Route or Stoppage, of which the following is a specification.

This invention relates to manually operated signal means for automobiles. Such means are adapted to indicate whether the driver of the automobile intends to divert the vehicle either to the right, or to the left, as for instance in turning from one street to another, or whether he intends to stop the vehicle from running.

The said signal indicator comprises means adapted to be attached to the brake pedal of an automobile or to a roller rotatable by hand or to both, and also to a roller mounted in a bracket and carrying an indicator arm, which is capable of being swung under the restraining influence of a spring into positions indicative of the course to which the driver of the automobile intends to divert the vehicle, or if the vehicle is to be stopped running. Electric light means may also be attached to the indicator arm for illuminating it at night time.

Referring to the accompanying drawings, Fig. 1 is a diagrammatic view showing the indicator means attached to the front portions of an automobile; Fig. 2 is a detail view of one arrangement of bracket and indicator arm attached thereto; Fig. 3 is a detail view on an enlarged scale of the bracket and arm shown in Fig. 2; Fig. 4 a broken cross section of the bracket and arm shown in Fig. 3; Fig. 5 a detail view of a modified arrangement of bracket and indicator arm; Figs. 6 and 7 detail views illustrating electrical means for enabling the indicator arm to be illuminated at night time; and Fig. 8 a diagrammatic view showing a rotatable roller with cords attached thereto.

With reference to Fig. 1 the brake pedal 1 has attached to it one end of a spring 2, the other end of the spring being connected to a stirrup 3 which in turn is connected by a flexible cord 12 to the rotatable roller 4 mounted on a spindle and preferably attached to the dashboard of the automobile in any convenient manner. The said roller carries the handle 5 which may be turned by the hand. Connected also to the roller 4 at one of its ends is the flexible cord 6 whose other end is attached to a roller 7 on which the indicator arm 11 is mounted; said roller also has attached to it one end of a cord 24 whose other end is secured to one end of the spring 8 which spring has its other end attached to the bracket 9 preferably affixed to the wind screen 10 by the clamp 13 or the like. A stop 25 is provided on the bracket 9 to prevent the arm 11 receding beyond its normal or lowest position. It is preferable that the cord 6 be carried on a spirally wound wire housing 26 which may be secured by staples or like means to the dashboard of the automobile. The roller 7 may have the spring attached thereto and to the bracket 9 as shown in Fig. 5 or in any other convenient manner. The function of the spring is to enable the indicator arm 11 to be swung into the "right", "stop", and "left" positions (marked 21, 22, 23 respectively) shown in dotted lines in Fig. 1 under the restraining influence of the spring and to return the arm to its normal position as shown in full lines in said figure by the release of tension of the spring when tension on the cords 12 and 6 which are connected to the spring is relaxed.

In Figs. 2 to 4 the hollow bracket 9 is shown fitted with a roller 7 mounted on the spindle 15 carried in said bracket; the indicator arm 11 is attached to said roller. Arranged internally of said bracket is a coiled spring 8 one end of which is fastened to the bracket and its other end is attached to the cord 24 which latter is also fastened to the roller 7; the cord 6 is also connected at one end to the roller 7. A guide roller 14 for the cord 6 may also be fitted to the bracket 9. When tension is applied to the cord 6 the roller 7 is turned, the spring 8 is extended, and the arm 11 is drawn from its normal to any of its indicator positions shown in dotted lines in Fig. 1 depending on the amount of tension applied to the cord 6. Upon relaxation of such tension the arm is returned to its normal position by the spring.

An alternative construction of roller 7 for the indicator arm 11 is shown in Fig. 5.

Said roller as shown in such figure is supported on the spindle 15 carried in the bracket 9 and has mounted on it the indicator arm 11. One end of the coiled spring 16 is fastened to the bracket 9 and its other end is fastened to the roller 7. Attached also to the bracket 9 is an electrical conductive metal plate 18, suitably insulated, adapted to be connected to a source of electric current. The indicator arm 11 has mounted on it an insulated electric conductive metal plate 19 wire connected to an electric lamp 20 secured to the arm 11. The plate 19 is positioned on the arm 11 in a manner to permit it to contact with the plate 18 to enable electric current to be supplied to the lamp 20 to illuminate the arm 11 if required when said arm is brought into any of its indicator positions as shown in dotted lines in Fig. 1. When, however, the arm 11 is returned to its normal position as shown in full lines in Fig. 1 the plates 18 and 19 will not be in contact, consequently current will not be furnished to light the lamp 20. The operation of the roller 7 shown in Fig. 6 is identical with the operation of the said roller as shown in Figs. 2 to 4. It will be understood that the electrical contact means shown in Figs. 5 to 7 may be substituted by other suitable means.

In operation, if the driver of the automobile wishes to give an indication by means of the arm 11 that he intends turning the vehicle toward the right or the left, or that the vehicle is to be stopped, he may move the handle 5 to turn the roller 4 in an anticlockwise direction and tension will thereby be applied to the cord 6 and the arm 11 will be brought to any of its indicator positions depending on the amount of tension applied to the cord 6. Upon the release of such tension the arm 11 will be returned to its normal position by the action of either the spring 8 or the spring 16. Instead, however, of turning the roller 4 by hand the driver may raise the arm 11 to its positions intended to indicate that the vehicle is to be turned by him either to the right or to the left or is to be stopped running by pressing on the stirrup 3 with his foot. In case a "stop" signal is to be given by the driver he may press with his foot on the brake pedal 1 only, and tension will thus be applied to the spring 2 and cord 12 and through the roller 4 to the cord 6, the arm 11 being thus raised to the "stop" position if sufficient pressure is exerted on the brake pedal 1.

What I claim as my invention and desire to secure by Letters Patent is:—

1. Signal means for automobiles comprising a bracket having one end fixed to the automobile, a roller revolubly supported in the outer end of the bracket, an indicator arm on said roller, a spring encased by the bracket and having one end connected thereto, flexible means operating through the bracket and having one portion connected to the spring and to the roller, and operating means connected with the other end portion of the flexible means.

2. Signal means for automobiles comprising a tubular bracket adapted to be attached to one end of the automobile, a roller revolubly mounted in the opposite end of the bracket, an indicator arm on said roller, a spring arranged within the tubular bracket and having one end connected thereto, a cord having one end portion rigidly connected to the roller and to the spring and trained about the roller and through the bracket and operating means connected with the other end of the cord.

3. Signal means for automobiles comprising a supporting bracket, a spring controlled roller mounted on the bracket, an indicator arm attached to said roller, a cord having one of its ends attached to the roller, a hand operated roller in communication with the other end of the cord, a second cord attached to said hand operated roller at one end, a stirrup carried by the other end of the second cord and a coil spring connected to said stirrup but having its other end adapted to the brake pedal of the automobile.

4. Signal means for automobiles comprising a bracket, a roller mounted on the bracket, an indicator arm on the roller, a cord having one end attached to the roller, a hand operated roller connected with the other end of the cord, a handle for the hand operated cord, a coil spring connected at its ends respectively to said bracket at said indicator arm roller to permit the indicator arm to be raised to signalling position and to return same to normal position, a second cord attached to said hand operated roller, a stirrup connected to said second cord and a second coil spring connecting one end to said stirrup and the other end to the brake pedal of the automobile.

In testimony whereof I have affixed my signature.

WILLIAM HENRY BAUERT.